(12) United States Patent
Galles et al.

(10) Patent No.: US 11,607,897 B2
(45) Date of Patent: Mar. 21, 2023

(54) DESKTOP PLASTIC CARD PRINTER WITH REMOVABLY INSTALLABLE SMART CARD CARTRIDGE

(71) Applicant: Entrust Corporation, Shakopee, MN (US)

(72) Inventors: Donald Galles, Shakopee, MN (US); Mark Sobania, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 189 days.

(21) Appl. No.: 17/245,404

(22) Filed: Apr. 30, 2021

(65) Prior Publication Data
US 2021/0339546 A1 Nov. 4, 2021

Related U.S. Application Data

(60) Provisional application No. 63/017,845, filed on Apr. 30, 2020.

(51) Int. Cl.
*B41J 13/12* (2006.01)
*B42D 25/23* (2014.01)
(Continued)

(52) U.S. Cl.
CPC ............ *B41J 13/12* (2013.01); *B41J 3/36* (2013.01); *B41J 3/407* (2013.01); *B41J 3/4075* (2013.01);
(Continued)

(58) Field of Classification Search
CPC ..... B41J 13/12; B41J 3/36; B41J 3/407; B41J 3/4075; B41J 3/50; B42D 25/23; B42D 25/22; G06K 17/0025
See application file for complete search history.

(56) References Cited

U.S. PATENT DOCUMENTS

| 5,927,878 A | 7/1999 | Kasai et al. |
| 7,398,972 B2 | 7/2008 | Schuller et al. |

(Continued)

FOREIGN PATENT DOCUMENTS

WO 2006-083521 A2 8/2006

OTHER PUBLICATIONS

International Search Report and Written Opinion, International Patent Application No. PCT/IB2021/053640, dated Aug. 6, 2021 (10 pages).

(Continued)

*Primary Examiner* — Henok D Legesse
(74) *Attorney, Agent, or Firm* — Hamre, Schumann, Mueller & Larson, P.C.

(57) ABSTRACT

A desktop plastic card printer that is configured to allow installation of a smart card cartridge within an interior space of the printer housing through an opening, for example an opening in a side wall, in the printer housing. Both the mechanical installation and electrical installation of the smart card cartridge occurs via the opening. This allows the desktop plastic card printer to be quickly and easily retrofitted to have the ability to electronically read data from and/or electronically program data on an integrated circuit chip of a plastic card. The retrofitting can take place without using any mechanical tools and without having to remove the entire, or a substantial portion of, the printer housing.

22 Claims, 16 Drawing Sheets

(51) Int. Cl.
*B41J 3/36* (2006.01)
*B41J 3/407* (2006.01)
*B41J 3/50* (2006.01)
B42D 25/22 (2014.01)

(52) U.S. Cl.
CPC ................ *B41J 3/50* (2013.01); *B42D 25/23* (2014.10); *B42D 25/22* (2014.10)

(56) References Cited

U.S. PATENT DOCUMENTS

| | | |
|---|---|---|
| 7,434,728 B2 | 10/2008 | Paulson et al. |
| 2004/0141294 A1 | 7/2004 | Wakabayashi et al. |
| 2007/0201934 A1* | 8/2007 | Ito .......................... B41J 3/4075 400/615.2 |
| 2008/0152417 A1 | 6/2008 | Heaton et al. |
| 2016/0300128 A1* | 10/2016 | Alvig ....................... B41J 13/12 |

OTHER PUBLICATIONS

EVOLIS Encoding option installation instructions, Evolis Card Printer, 2012 (18 pages).

\* cited by examiner

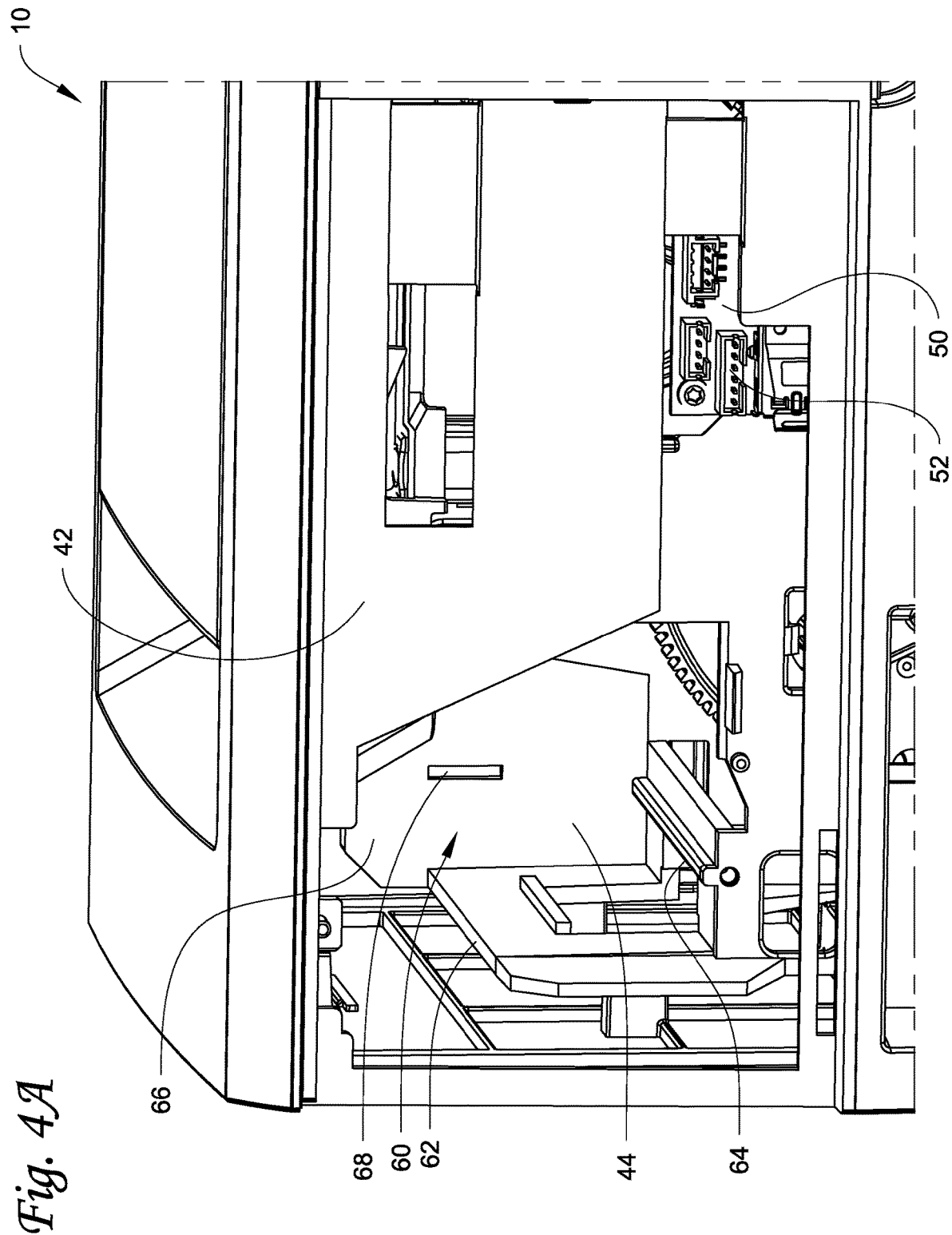

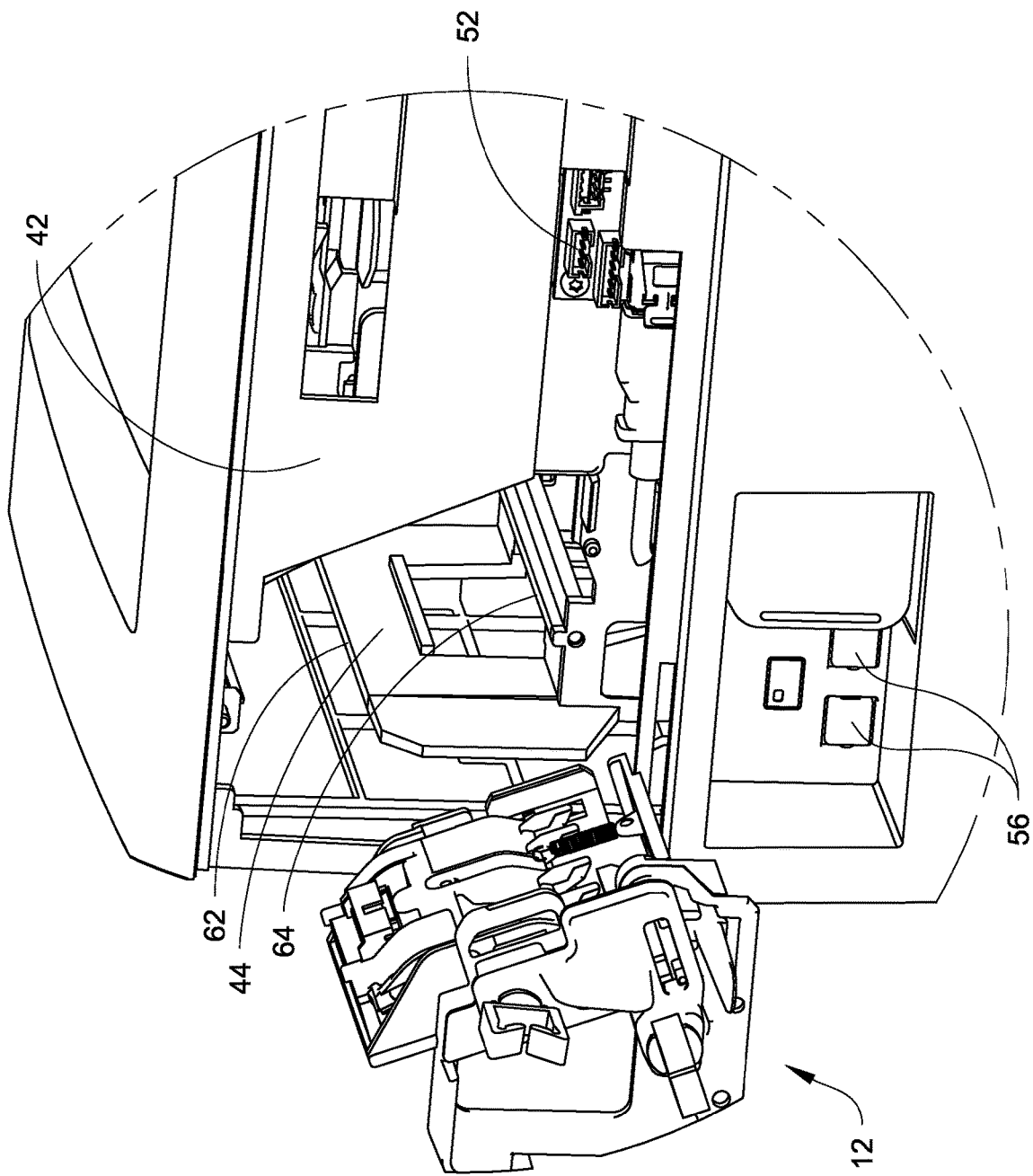

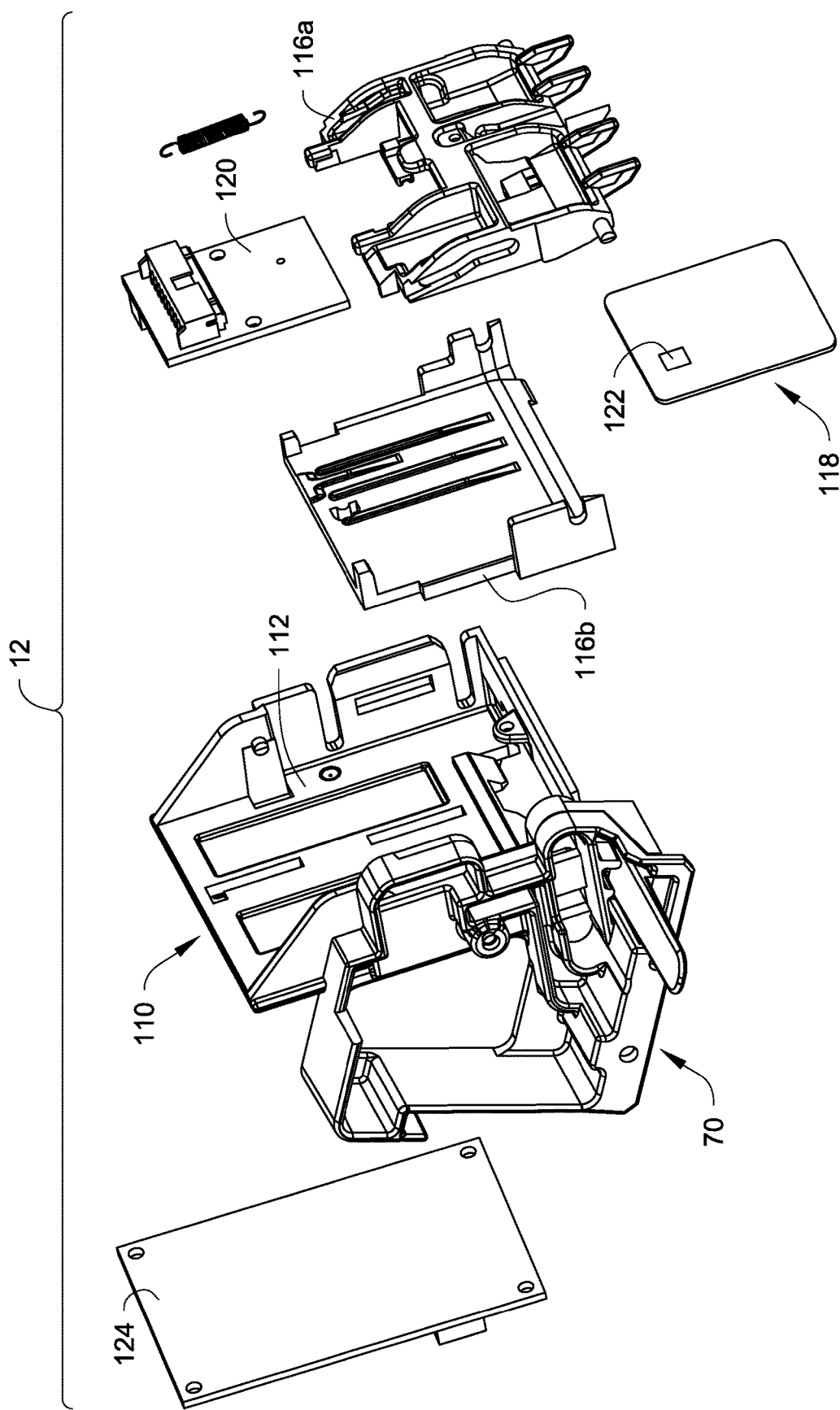

DESKTOP PLASTIC CARD PRINTER WITH REMOVABLY INSTALLABLE SMART CARD CARTRIDGE

FIELD

This technical disclosure relates to desktop plastic card printers and to a smart card cartridge that is removably installable in the desktop plastic card printer to read data from an integrated circuit chip on a plastic card and/or to electronically program data on the integrated circuit chip on the plastic card.

BACKGROUND

The use of desktop plastic card printers to process plastic cards is known. Conventional desktop plastic card printers typically include at least a print mechanism for performing printing operations on the plastic cards. Increasingly, plastic cards are being issued that include an integrated circuit chip where data can be electronically read from and/or electronically programmed on the integrated circuit chip.

Some desktop plastic card printers are manufactured with the ability to electronically read data from and/or electronically program data on the integrated circuit chip in addition to including printing capability. In other instances, the desktop plastic card printer is retrofitted with a mechanism that allows the desktop plastic card printer to electronically read data from and/or electronically program data on the integrated circuit chip of the plastic card. However, retrofitting a current desktop plastic card printer with integrated circuit chip reading and/or programming capability is time consuming and requires removal of the printer housing as well as requires tools to complete the retrofit operation.

SUMMARY

A desktop plastic card printer and method are described where the desktop plastic card printer can be quickly and easily retrofitted to have the ability to electronically read data from and/or electronically program data on an integrated circuit chip of a plastic card. The retrofitting can take place without using any mechanical tools and without having to remove the entire or a substantial portion of the printer housing.

The desktop plastic card printer is configured to allow installation (both mechanical installation and electrical installation) of a smart card cartridge within an interior space of the printer housing through an opening, for example an opening in a side wall, in the printer housing. The mechanical installation or mechanical mounting of the smart card cartridge, as well as electrical installation or electrical connection of the smart card cartridge to the desktop plastic card printer, occurs via the opening. The smart card cartridge can be the first smart card cartridge installed in the desktop plastic card printer, or the smart card cartridge can replace a smart card cartridge that has been removed from the desktop plastic card printer, for example removed through the opening in the printer housing.

A smart card cartridge described herein is a device that is configured to electronically read data from and/or electronically program data on the integrated circuit chip of the plastic card. The smart card cartridge can be configured to perform contact reading from and/or programming of data on the integrated circuit chip of the plastic card, contactless reading from and/or programming of data on the integrated circuit chip of the plastic card, or both contact and contactless reading and/or programming of data. Unless indicated to the contrary, the term "programming" as in contact or contactless programming mechanism is intended to encompass both actual programming of data on the integrated circuit chip as well as reading data from the integrated circuit chip.

Plastic cards include, but are not limited to, financial (e.g., credit, debit, or the like) cards, driver's licenses, national identification cards, business identification cards, gift cards, and other plastic cards having an integrated circuit chip. Plastic cards with an integrated circuit chip may also be referred to as smart card. In some embodiments, the plastic cards may also have a magnetic stripe in addition to the integrated circuit chip, in which case the desktop plastic card printer may also include a magnetic strip read/write station which is known in the art.

In one embodiment, a method of retrofitting a desktop plastic card printer to include smart card (or integrated circuit chip) capability includes installing a smart card cartridge within the interior of the desktop plastic card printer without removing the entire or a substantial portion of the printer housing. For example, a panel covers an opening in the housing that provides access to an interior space of the housing. The panel can be actuated from a closed position covering the opening to an open position where the opening is not covered by the panel. The panel forms a portion of the housing and can be located on any wall of the housing, for example on a side wall of the housing. After actuating the panel to the open position, the smart card cartridge is then mechanically installed into the interior space of the housing through the opening, where the smart card cartridge is configured to electronically read data from and/or electronically program data on an integrated circuit chip of a plastic card.

In addition, the smart card cartridge is electrically connected to at least one smart card electrical connection of the desktop plastic card printer that is accessible through the opening. After installation of the smart card cartridge, the panel may then be returned to the closed position to cover the opening in the wall.

In another embodiment, a desktop plastic card printer includes a printer housing having a wall with a panel that is configured to cover an opening in the wall that provides access to an interior space of the printer housing. The panel is actuatable between a closed position where the panel covers the opening and an open position where the opening is not covered by the panel. The interior space includes a smart card cartridge mount that is configured to removably receive a smart card cartridge that is configured to electronically read data from and/or electronically program data on an integrated circuit chip on a plastic card, and the smart card cartridge mount is adjacent to the opening whereby the smart card cartridge can be mechanically installed onto and removed from the smart card cartridge mount through the opening. In addition, at least one smart card electrical connection is accessible through the opening, where the at least one smart card electrical connection is electrically connectable to the smart card cartridge.

The printer housing of the desktop plastic card printer can have a front end, a rear end opposite the front end, a first side wall, a second side wall opposite the first side wall, a top, and a bottom. A card input hopper can be mounted on the printer housing where the card input hopper is configured to hold a plurality of plastic cards to be processed and from which the plastic cards are fed one-by-one for processing by the desktop plastic card printer. In addition, the desktop plastic card printer can include a card output from which processed plastic cards are output after being processed by the desktop plastic card printer. Further, a plastic card printing mechanism can be disposed in the printer housing, where the plastic card printing mechanism is configured to print on the plastic cards fed from the card input hopper. The printing mechanism can be any type of printing mechanism that is suitable for performing printing on a plastic card including, but not limited to, thermal transfer printing mechanism, a retransfer printing mechanism, a drop-on-demand printing mechanism, and the like. The panel can form a portion of any one of the walls, such as the first side wall where the opening is also formed in the first side wall.

In another embodiment, a smart card cartridge is described that is removably installable within the desktop plastic card printer. The smart card cartridge can include a chassis that defines a plastic card receiving area that is configured to receive a plastic card during electronically reading data from and/or electronically programming data on an integrated circuit chip on the plastic card. A contact or contactless integrated circuit chip programming mechanism is mounted on the chassis adjacent to the plastic card receiving area. First and second rail guides on the chassis are configured to engage with rails formed on the desktop plastic card printer for removably mounting the smart card cartridge within the desktop plastic card printer. A snap retention mechanism on the chassis is configured to snap fit connect with the desktop plastic card printer. In addition, at least one electrical connection is on the chassis that is configured for electrically connecting the smart card cartridge to at least one smart card electrical connection of the desktop plastic card printer.

DRAWINGS

FIGS. 4A and 4B are perspective and side views, respectively, of the opening in the housing.

FIG. 5 is a perspective view showing the pass-through board installed and the smart card cartridge ready to be installed.

FIG. 8 is an exploded perspective view of the smart card cartridge.

DETAILED DESCRIPTION

Figure 1:
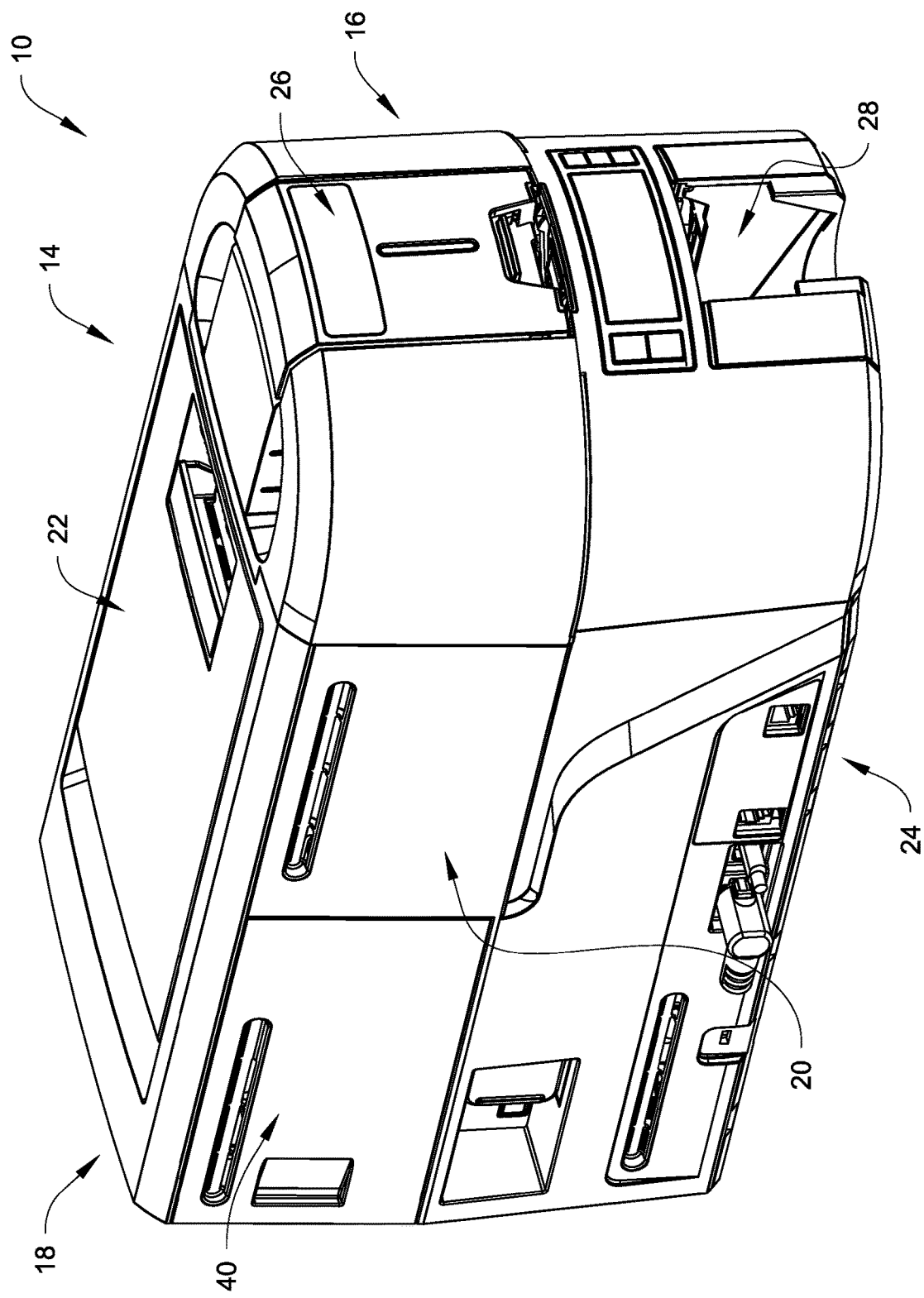
FIG. 1 is a perspective view of an example of a desktop plastic card printer described herein.

The following describes a desktop plastic card printer 10 and method where the desktop plastic card printer 10, referred to hereinafter as printer 10, can be quickly and easily retrofitted with a smart card cartridge 12 so that the printer 10 has the ability to electronically read data from and/or electronically program data on an integrated circuit chip of a plastic card. The retrofitting can be achieved without using any mechanical tools and without having to remove the entire or significant portions of the printer housing. The smart card cartridge 12 can be installed (both mechanically installed and electrically installed) within an interior space of the printer housing through an opening in the printer housing. The mechanical installation or mechanical mounting of the smart card cartridge 12, as well as electrical installation or electrical connection of the smart card cartridge 12 to the printer 10, occurs via the opening.

The printer 10 described herein is designed for relatively small scale, individual plastic card processing. In desktop plastic card printers, typically a single plastic card to be processed is input into the system, processed, and then output. These types of printers are often termed desktop printers because they have a relatively small footprint intended to permit the printer to reside on a desktop and that is designed to personalize plastic cards in relatively small volumes, for example measured in tens or low hundreds per hour. Many examples of desktop printers are known, such as the SD or CD family of desktop card printers, such as the CD800 Card Printer, available from Entrust Corporation of Shakopee, Minn. Other examples of desktop card printers are disclosed in U.S. Pat. Nos. 7,434,728 and 7,398,972, each of which is incorporated herein by reference in its entirety.

The smart card cartridge 12 described herein is a device that is configured to electronically read data from and/or electronically program data on the integrated circuit chip of the plastic card. The smart card cartridge 12 can be configured to perform contact reading from and/or programming of data on the integrated circuit chip of the plastic card, contactless reading from and/or programming of data on the integrated circuit chip of the plastic card, or both contact and contactless reading and/or programming of data. Devices that perform contactless and/or contact programming on integrated circuit chips on plastic cards are well known in the art. For example, an example of a mechanism for contactless programming of an integrated circuit chip is the programming device used on the CD800 Card Printer available from Entrust Corporation of Shakopee, Minn.

Plastic cards include, but are not limited to, financial (e.g., credit, debit, or the like) cards, driver's licenses, national identification cards, business identification cards, gift cards, and other plastic cards having an integrated circuit chip. Plastic cards with an integrated circuit chip may also be referred to as smart card. In some embodiments, the plastic cards may also have a magnetic stripe in addition to the integrated circuit chip, in which case the desktop plastic card printer may also include a magnetic strip read/write station which is known in the art. The plastic cards may be entirely made of plastic, or substantial portions thereof made of plastic.

Figure 2:
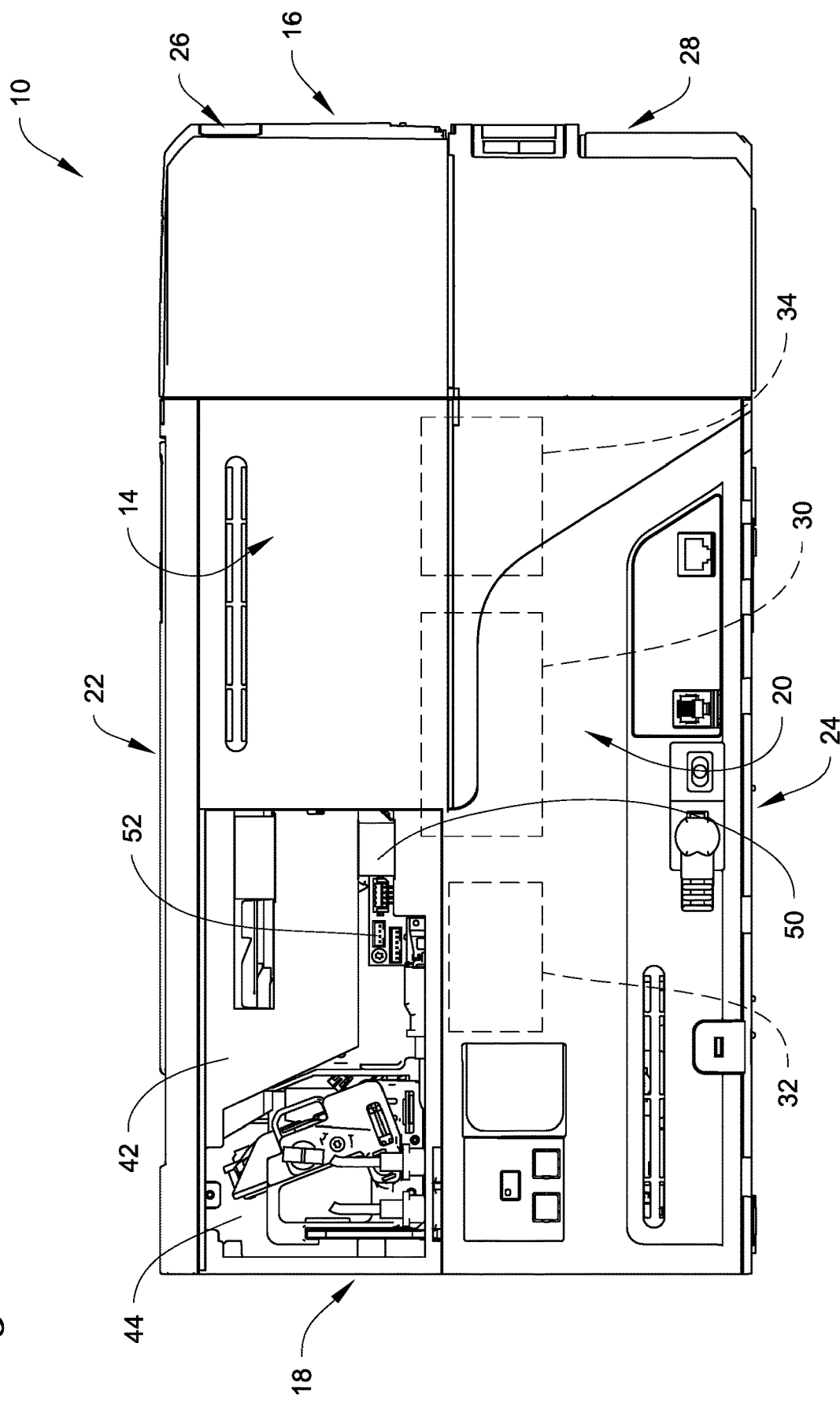
FIG. 2 is a side view of the desktop plastic card printer of FIG. 1 showing an opening for installing the smart card cartridge, with the smart card cartridge installed.

Referring to FIGS. 1-2, the printer 10 includes a printer housing 14 having a front end 16, a rear end 18 opposite the front end 16, a first side wall 20, a second side wall (not visible) opposite the first side wall 20, a top 22, and a bottom 24. The printer 10 further includes a card input hopper 26 that is configured to hold a plurality of plastic cards to be processed and from which the plastic cards are fed one-by-one for processing by the printer 10. For example, the input hopper 26 can be mounted on the printer housing 14 such as at the front end 16 although other locations are possible. The printer 10 also includes a card output 28 from which processed plastic cards are output after being processed by the printer 10. The output 28 can be located on the printer housing 14 at any location that is suitable for performing the functions of the output 28. For example, FIGS. 1-2 illustrate the output 28 as being at the front end 16 although other locations are possible. The output 28 can be an output hopper configured to hold a plurality of processed cards, or an output slot.

The interior of the printer 10 can include a number of mechanisms for handling and processing plastic cards during processing in the printer 10. For example, referring to FIG. 2, the printer 10 can include a plastic card printing mechanism 30, a card reorienting mechanism or flipper 32, and an optional magnetic stripe read/write mechanism 34 each of which is depicted schematically in FIG. 2. The card printing mechanism 30 is configured to print on the plastic cards fed from the input hopper 26. The printing mechanism 30 can be configured to perform any type of printing known in the art including, but not limited to, direct to card thermal printing, retransfer printing, drop-on-demand printing, and the like. The card reorienting mechanism 32 is configured to reorient the card and direct the card into and from the smart card cartridge 12 and flip the card 180 degrees for dual sided printing on a card. Card reorienting mechanisms are known in the art. The optional magnetic stripe read/write mechanism 34 is configured to read data from and/or write data to a magnetic stripe on the card. Magnetic stripe read/write mechanisms are known in the art.

The card can be transported through the printer 10 by one or more suitable mechanical card transport mechanisms (not shown). Mechanical card transport mechanism(s) for transporting cards in desktop card printers of the type described herein are well known in the art. Examples of mechanical card transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art. A person of ordinary skill in the art would readily understand the type(s) of card transport mechanisms that could be used, as well as the construction and operation of such card transport mechanisms.

The printer 10 is configured so that a portion of the housing 14 can be moved or actuated from a closed position to an open position to uncover an opening that provides access to an interior space of the printer 10 in which the smart card cartridge 12 is installed. Once the smart card cartridge 12 is installed, the housing portion can be moved back to the closed position to cover the opening. The portion of the housing 14 can be located anywhere where one may wish to removably install the smart card cartridge 12 in the printer 10. The housing portion can be detached from the housing 14 at the open position (see FIGS. 1-3) or the housing portion can remain attached to the housing 14 at the open position (see FIGS. 12A-B).

Figure 3:
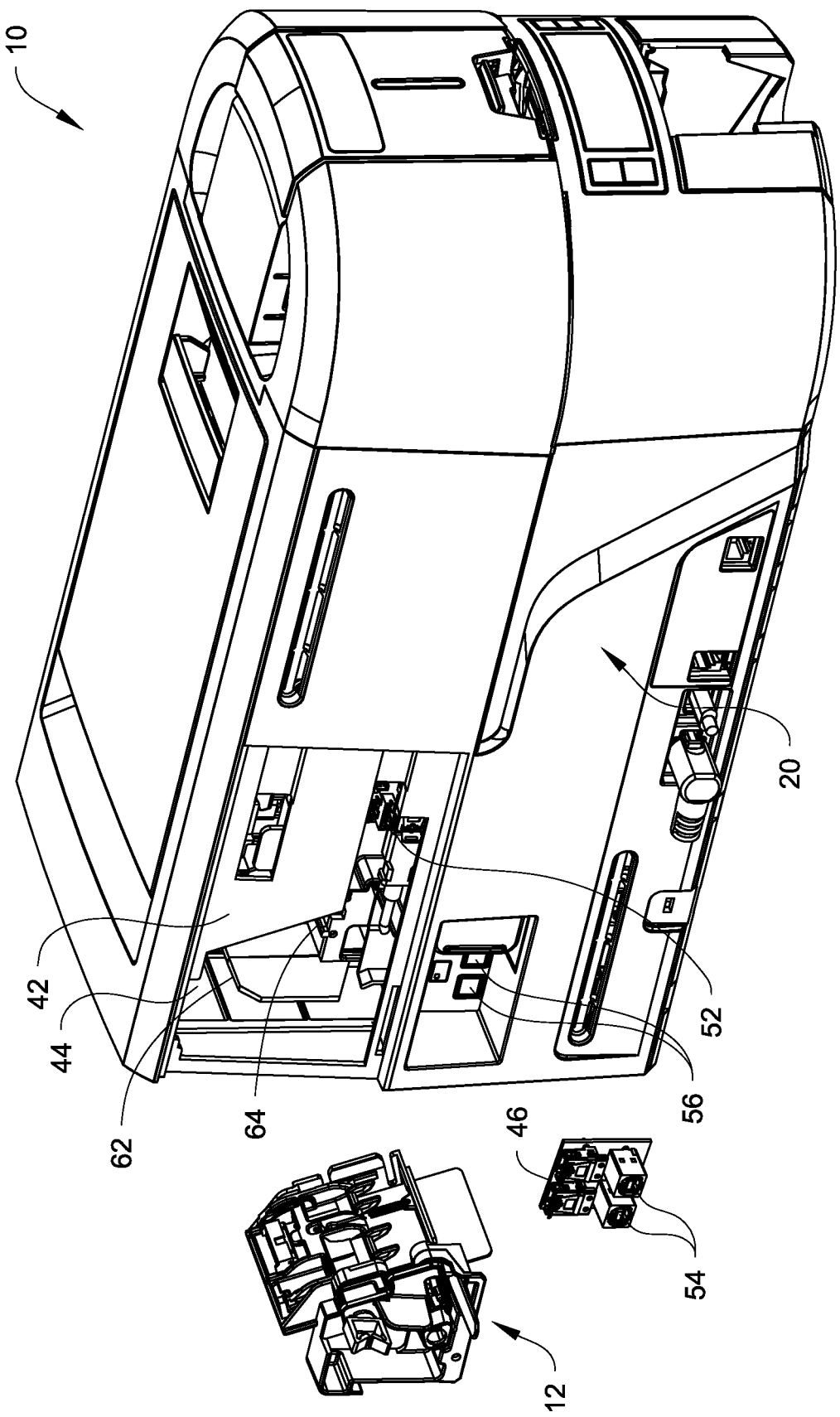
FIG. 3 depicts the smart card cartridge and the smart card pass-through board removed from the desktop plastic card printer.
Figure 4B:
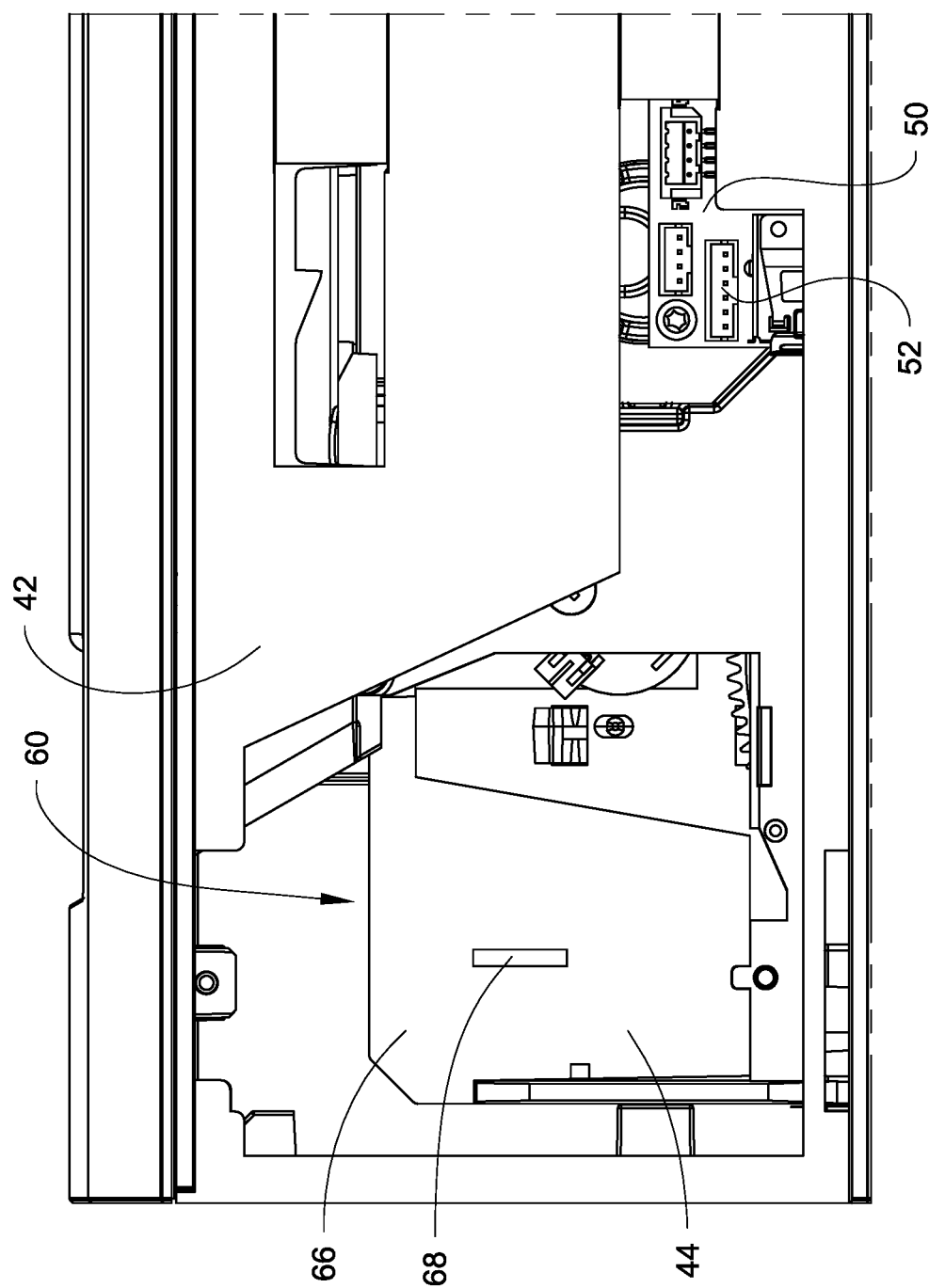
Figure 6A:
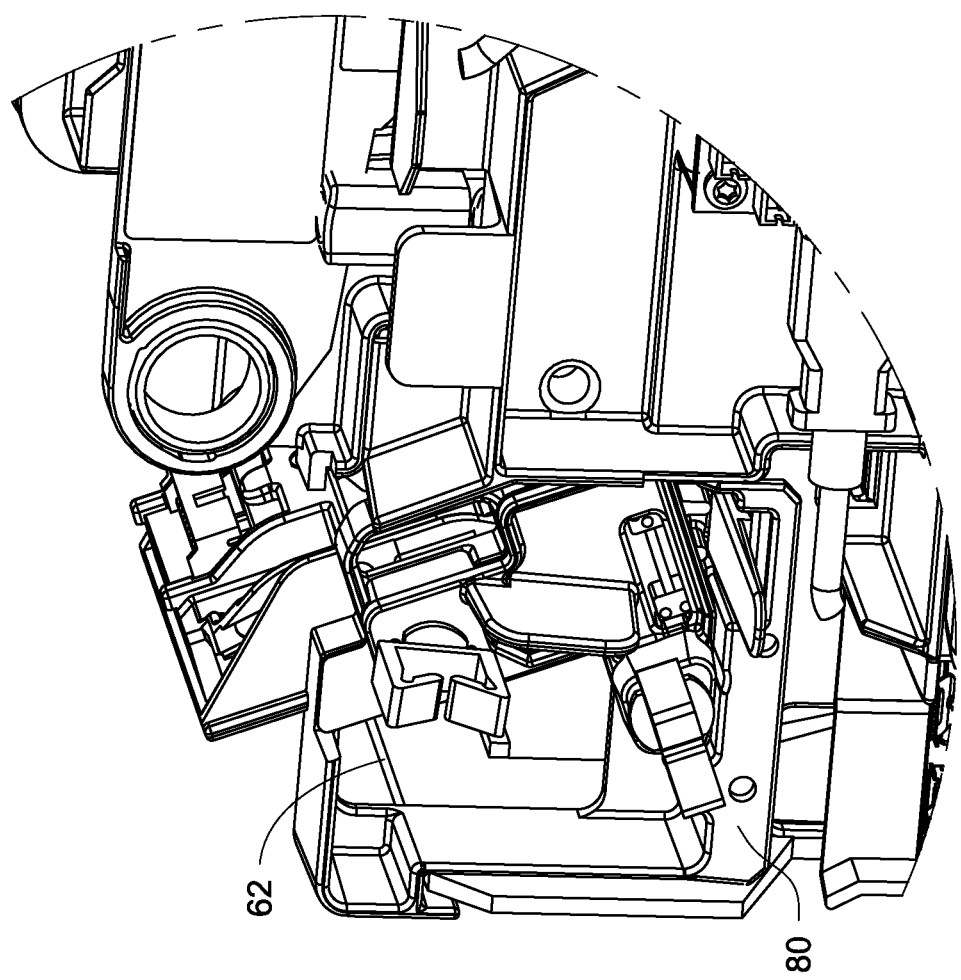
FIGS. 6A and 6B are perspective views of the smart card cartridge mounted in place on the printer chassis.
Figure 6B:
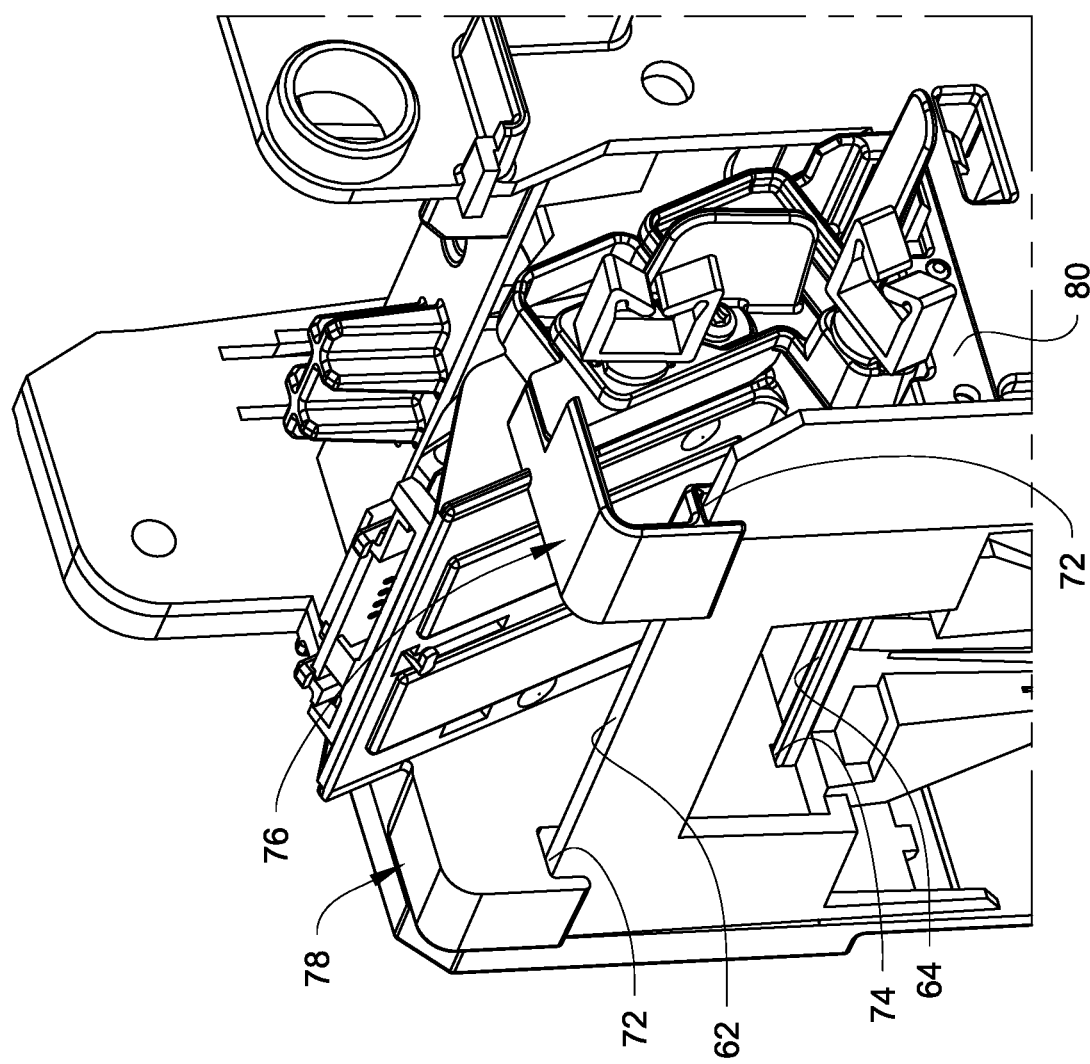

Referring to FIGS. 1-3, the housing 14 is illustrated as including a removable panel 40 (FIG. 1) which can be located on the first side wall 20 or on any other wall. In one embodiment, the panel 40 can be removed without using mechanical tools. The panel 40 forms a portion of the total area of the first side wall 20. The panel 40 has a closed position (shown in FIG. 1) where the panel 40 covers an opening 42 (FIGS. 2 and 3) in the first side wall 20 that provides access to an interior space 44 of the printer 10 in which the cartridge 12 can be removably installed via the opening 42. FIG. 2 shows the panel in an open position thereby exposing the opening 42 with the cartridge 12 installed in the interior space 44. FIG. 3 also shows the panel in the open position thereby exposing the opening 42 with the cartridge 12 removed from the interior space 44. FIG. 3 also depicts an optional smart card pass-through board 46 (described in further detail below) removed from the printer 10. In this embodiment, the panel 40 can be completely removed from the printer housing 14 so that the panel 40 is no longer attached to the housing 14 at the open position. When installation or removal of the cartridge 12 is complete, the panel 40 can be reattached to recover the opening 42.

Figure 12A:
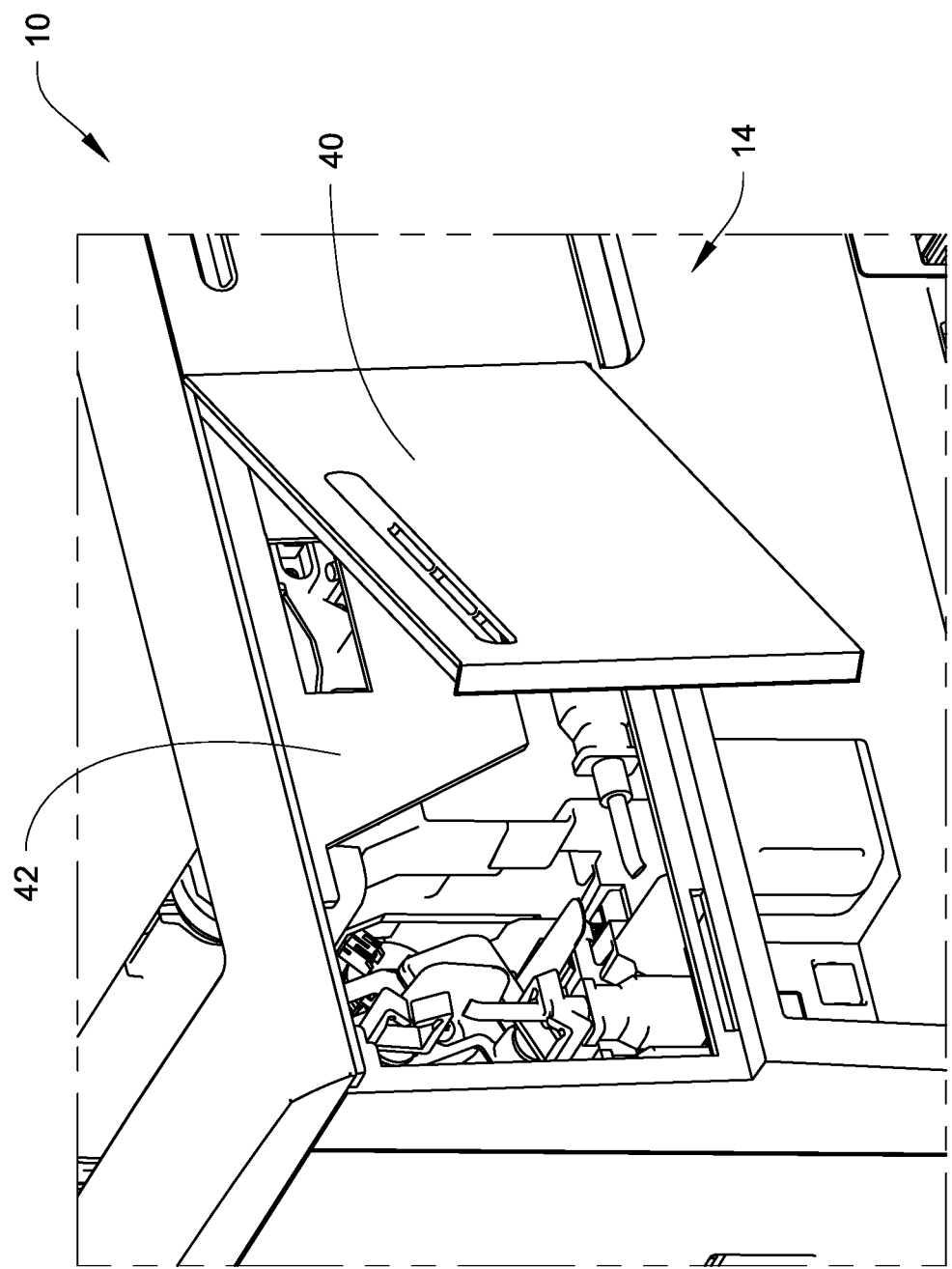
FIGS. 12A and 12B illustrate additional embodiments of panels that can cover the opening in the housing.
Figure 12B:
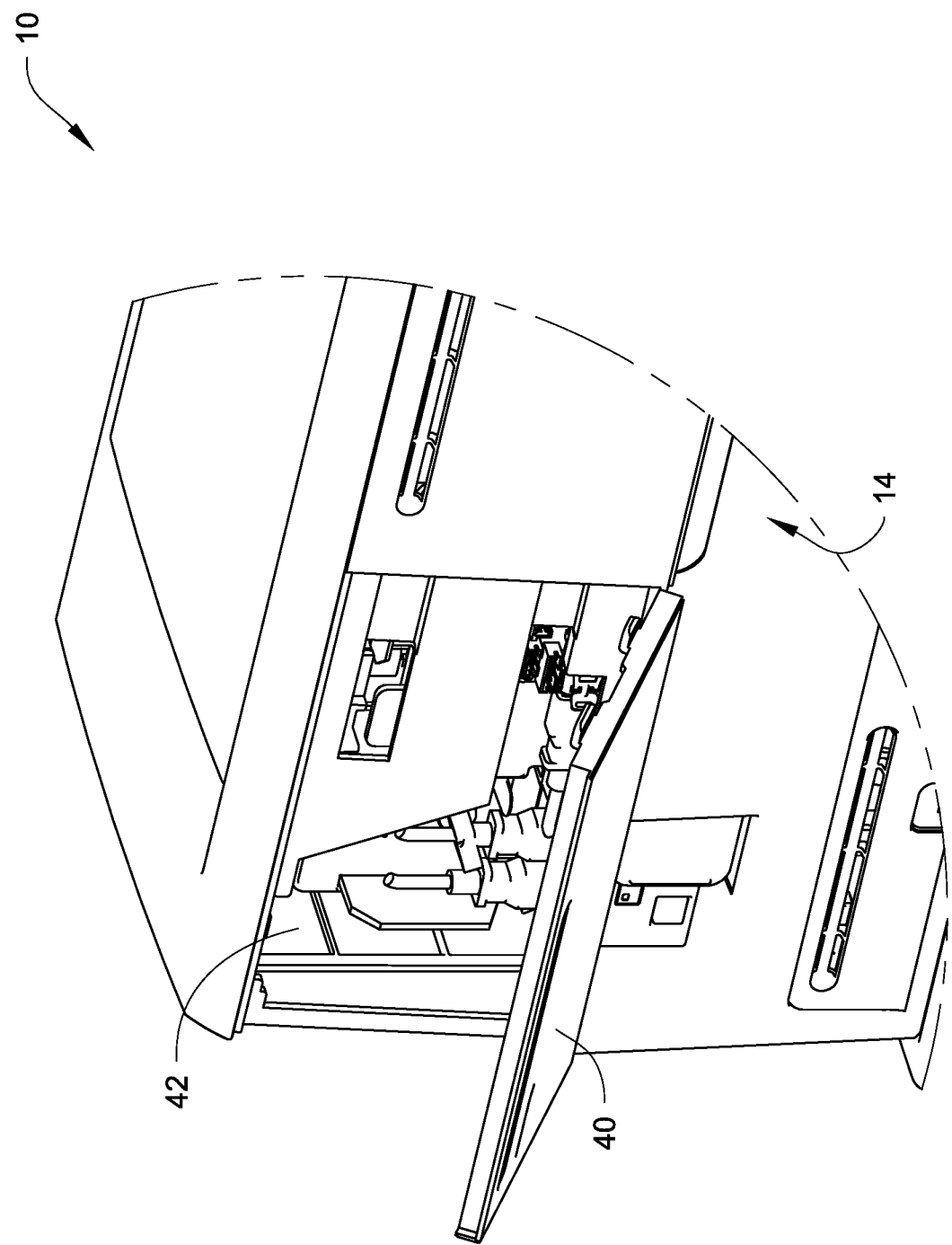

In other embodiments, the panel 40 can remain attached to the housing 14 at the open position. For example, FIGS. 12A and 12B illustrate embodiments where the panel 40 is pivotally attached to the housing 14 along one edge of the panel 40, for example a side edge of the panel 40 in FIG. 12A or a bottom edge of the panel in FIG. 12B. In these embodiments, when the panel 40 moves or swings to the open position to uncover the opening 42, the panel 40 remains attached to the housing 14 and the panel 40 can be swung back to the closed position to cover the opening 42 when installation or removal of the cartridge 12 is complete.

Figure 13:
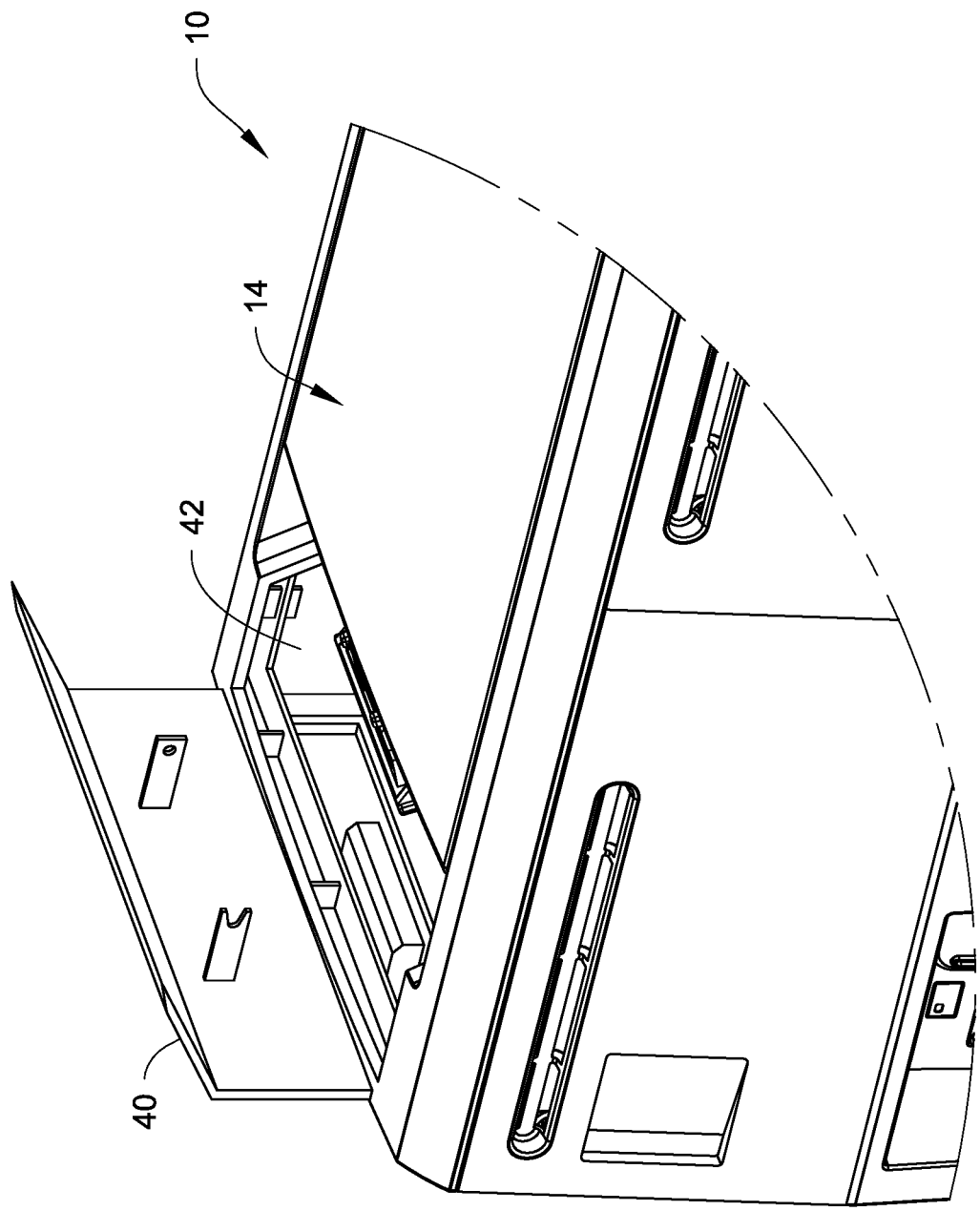
FIG. 13 illustrates an embodiment where the panel and the opening are in the top of the printer.

FIG. 13 illustrates an embodiment where the cartridge is installed and removed via the opening 42 which is located in the top of the printer 10. In this embodiment, the panel 40 and the opening 42 covered thereby are on a top wall of the housing 14. The panel 40 can be detached from the housing 14 when at the open position (like the panel in FIGS. 1-3), or the panel 40 can remain attached to the housing 14 at the open position (like the panels in FIGS. 12A-B).

The cartridge 12 can be removably mechanically installed in the printer 10 without using any mechanical tools. In addition, electrical connection between the cartridge 12 and the printer 10 can be achieved via the opening 42 without using any mechanical tools. The smart card pass-through board 46, if used, can also be installed and removed via the opening 42 without using any mechanical tools to connect or disconnect a mechanical fastener(s). In some embodiments, removing the board 46 may be aided by a mechanical tool, such as a screwdriver or pliers, to pry the board 46 from its mounting location.

Referring to FIGS. 2-5, a portion of an internal circuit board 50 of the printer 10 is visible in the opening 42 when the panel is at the open position. The circuit board 50 is within the housing 14, and the portion of the circuit board 50 that overlaps the opening 42 includes at least one smart card electrical connection 52. The smart card electrical connection 52 is directly visible within the opening 42 and permits electrical connection between the cartridge 12 and the printer 10.

Returning to FIG. 3, the pass-through board 46, if used, provides an alternative means to achieve electrical connection with the cartridge 12. The board 46 includes at least one electrical connection port 54, for example a USB port, thereon. In the example illustrated in FIG. 3, the board 46 has two of the electrical connection ports 54. When the board 46 is installed, the port(s) 54 align with port openings 56 in the side wall to allow exterior access to the port(s) 54.

The smart card reader on the cartridge 12 can be configured as a contactless reader or as a contact reader, depending upon the type of integrated circuit chip on the card. The construction and operation of contactless readers and contact readers, and readers that are configured to perform both contactless reading or contact reading, are known in the art.

In one embodiment, electrical power and data for the cartridge 12 can be provided by a single wire connection between the cartridge 12 and the electrical connection 52. In this "single wire" embodiment, the printer 10 communicates with the reader of the cartridge 12 directly (i.e. electrical power, control of reader functions and data flow goes through the printer 10). In what can be referred to as a "loosely coupled smart card" embodiment, the end user of the printer 10 controls the smart card reader and data communication with the smart card reader directly. The "loosely coupled smart card" embodiment is beneficial for end users of the printer 10 with established smart card systems (for example, hospitals with employee smart card chip badges). In the "loosely coupled smart card" embodiment, the printer 10 only controls the card transport into and out of the reader of the cartridge 12. The "single wire" embodiment and the "loosely coupled smart card" embodiment use a different connection with the reader of the cartridge 12. In both embodiments, a card registration sensor, for example a photocell sensor, of the reader is electrically connected to the circuit board 50. In addition, when the reader is a contact chip reader, another cable connects the contact chip reader to the circuit board 50. In another embodiment, all the connections needed for the "single wire" embodiment and the "loosely coupled smart card" embodiment could be provided on a smart card daughter board that connects to the circuit board 50 when the cartridge 12 is inserted into the printer 10.

So in the "single wire" embodiment, when the cartridge 12 includes a contact/contactless reader, the data and power for the reader, the registration photocell sensor, and the cable for the contact reader can all connect to the circuit board 50, and when the cartridge 12 includes just a contactless reader, the data and power for the reader, and the registration photocell sensor can connect to the circuit board 50. In the "loosely coupled smart card" embodiment, when the cartridge 12 includes a contact/contactless reader, the data and control for the reader can be connected to the board 46, while the registration photocell sensor and the cable for the contact reader connect to the circuit board 50, and when the cartridge 12 includes just a contactless reader, the data and control for the reader can be connected to the board 46 while the registration photocell sensor connects to the circuit board 50.

The cartridge 12 can be removably mounted in the interior space 44 in any suitable manner that provide a stable securement of the cartridge 12 allowing the cartridge 12 to perform its chip reading/programming function. Referring to FIGS. 3-5 and 7A, one example of a mount for the cartridge 12 (which may be referred to a smart card cartridge mount) is illustrated. The printer 10 includes a fixed, stationary printer chassis 60 located in the interior space 44. The chassis 60 defines a first rail 62 (best seen in FIG. 4A) and a second rail 64 (best seen in FIG. 4A). The rails 62, 64 are parallel to each other, with the rails 62, 64 being slightly axially displaced so that the rail 62 is closer to the rear end 18 than is the rail 64, and the rail 62 is vertically higher in the printer 10 than the rail 64. The rails 62, 64 are also perpendicular to a direction that a card enters and exists the cartridge 12. The chassis 60 also includes an end wall 66 that includes a slot 68 formed therein.

Figure 7A:
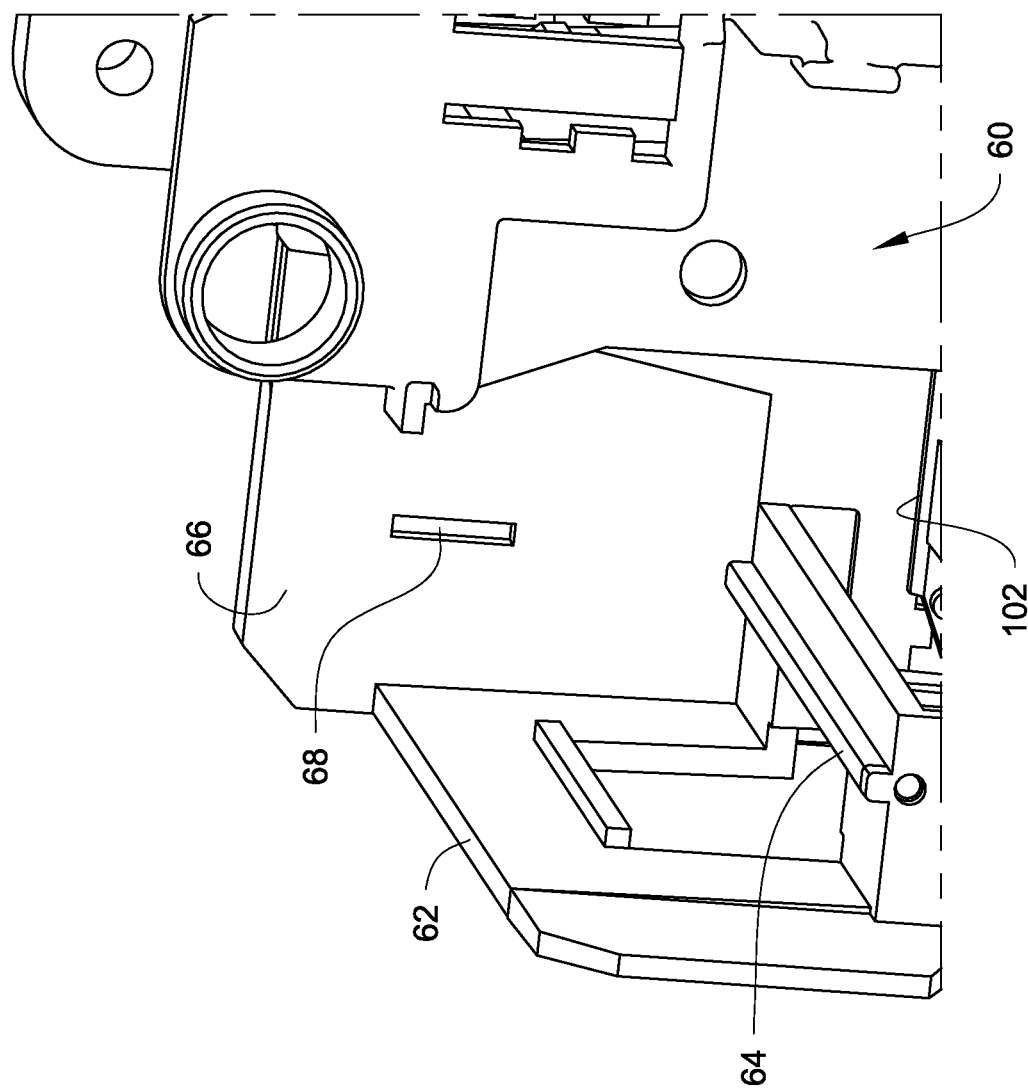
FIGS. 7A and 7B are perspective views of the printer chassis showing how the back side of the smart card cartridge is secured.
Figure 7B:
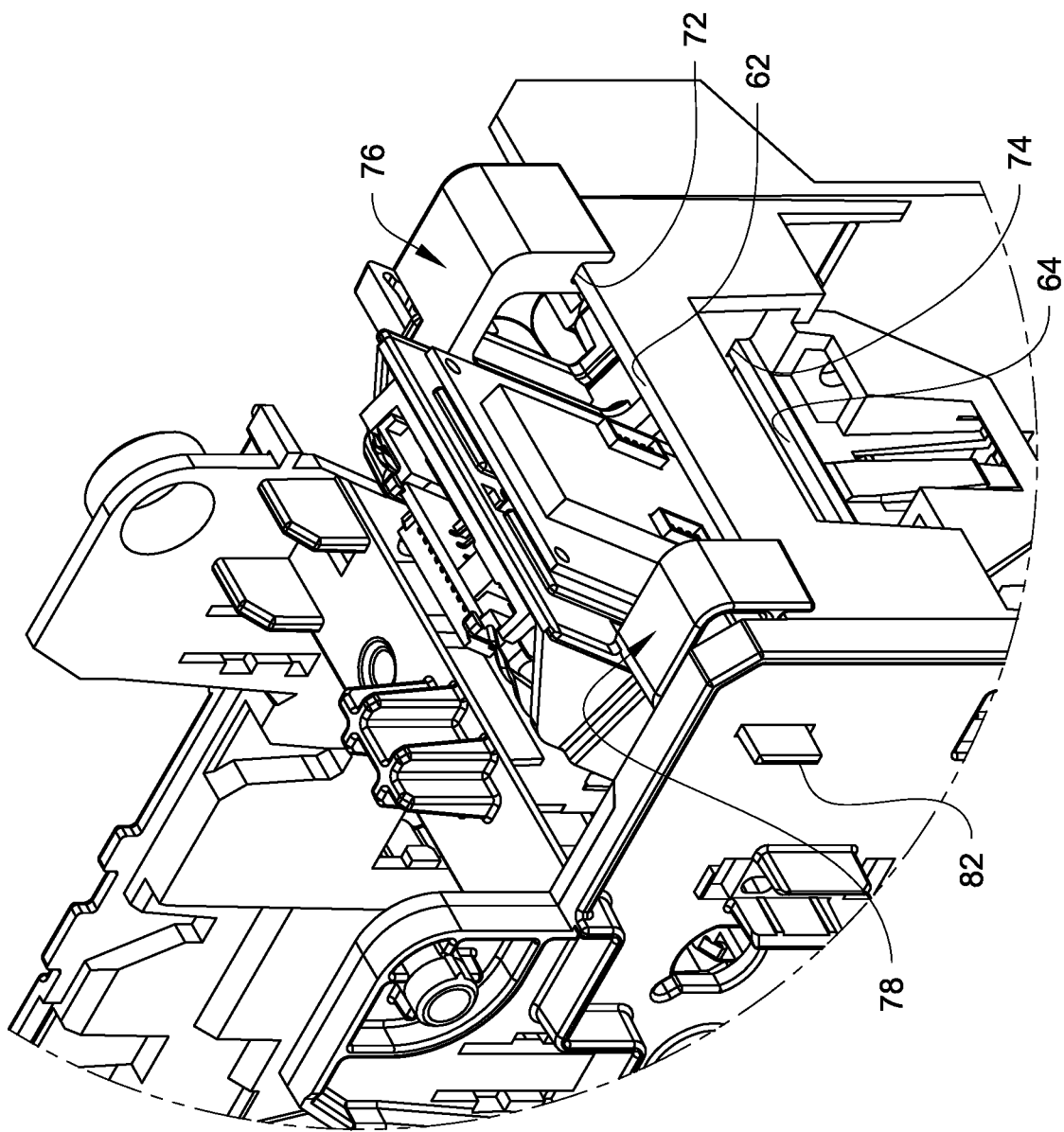
Figure 11:
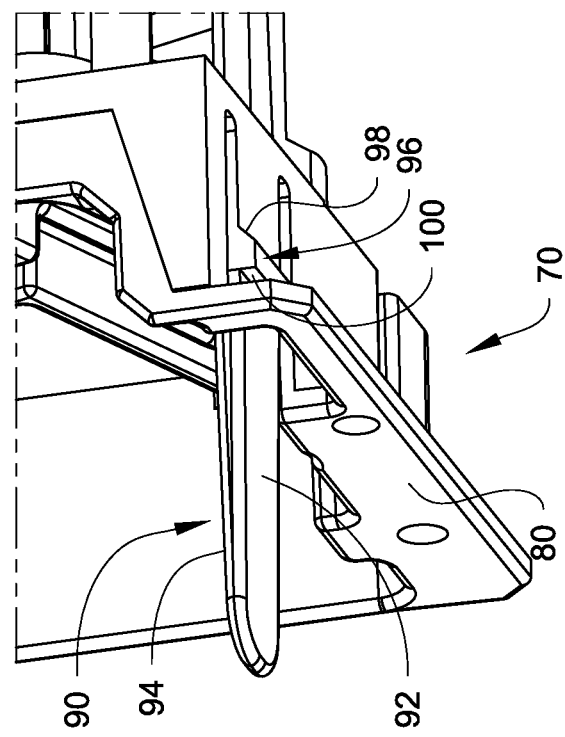
FIG. 11 is a perspective view of a snap lock mechanism on the smart card chassis.

The cartridge 12 includes a cartridge chassis 70 that interacts with the rails 62, 64 and the slot 68 to help secure the cartridge 12 in position. For example, referring to FIGS. 6, 7B, 9 and 10, the chassis 70 includes first and second rail guides 72, 74, for example in the form of slots, that are configured to engage with the rails 62, 64 respectively (best seen in FIG. 7B). The first and second rail guides 72, 74 are located on a first side of the chassis 70 opposite the side the card is located during reading/programming, and the first rail guide 72 is located vertically above the second rail guide 74. In the illustrated example, the first and second rail guides 72, 74 are defined on first and second spaced supports 76, 78, with a first rail guide portion of each rail guide 72, 74 formed on the support 76 and a second rail guide portion of each rail guide 72, 74 formed on the support 78. Therefore, the rail guides 72, 74 are discontinuous in a direction that is parallel to the direction of the rails 62, 64. The rail guide 74 is closed by an end wall 80 of the chassis 70 as best seen in FIGS. 10 and 11. The end wall 80 acts as a stop that the rail 64 abuts against to define a fully installed position of the cartridge 12. In addition, as best seen in FIG. 10, the second support 78 includes a tab 82 that projects therefrom. As seen in FIG. 7B, the tab 82 extends into the slot 68 when the cartridge 12 is installed to help secure the cartridge 12 against vertical movement.

The cartridge 12 (or the printer 10) can also include a releasable retention mechanism that can be automatically actuated upon insertion of the cartridge 12 to releasably lock the cartridge 12 in position and that can be manually actuated to release the retention and permit manual removal of the cartridge 12. The releasable retention mechanism can have any construction. For example, referring to FIGS. 7A and 11, the releasable retention mechanism can be a snap retention mechanism 90 on the chassis 70 that is configured to snap fit connect with the chassis 60. The mechanism 90 includes a resilient lever 92 that can be integrally formed with the chassis 70 and that can be manually deflected, for example vertically upward, and then automatically return to the position shown in FIG. 11. The lever 92 includes a finger gripping portion 94 that projects a distance from the chassis 70 allowing the user to actuate the lever 92. The lever 92 further includes a protrusion 96 on the bottom surface thereof. The protrusion 96 includes a ramp surface 98 thereon and an opposite vertical locking surface 100. In operation, as the cartridge 12 is being inserted into the printer 10 and nears its fully installed position, the ramp surface 98 engages a portion 102 of the chassis 60. The portion 102 deflects the lever 92 upward until the protrusion 96 clears the portion 102 at which time the lever 92 returns down due to the bias acting thereon and the locking surface 100 of the protrusion 96 snaps behind the interior surface of the portion 102. To remove the cartridge 12, the user lifts upwardly on the lever 96 until the protrusion 96 clears the portion 102 at which point the cartridge 12 can be slid from the chassis 60 and the interior space 44.

Figure 9:
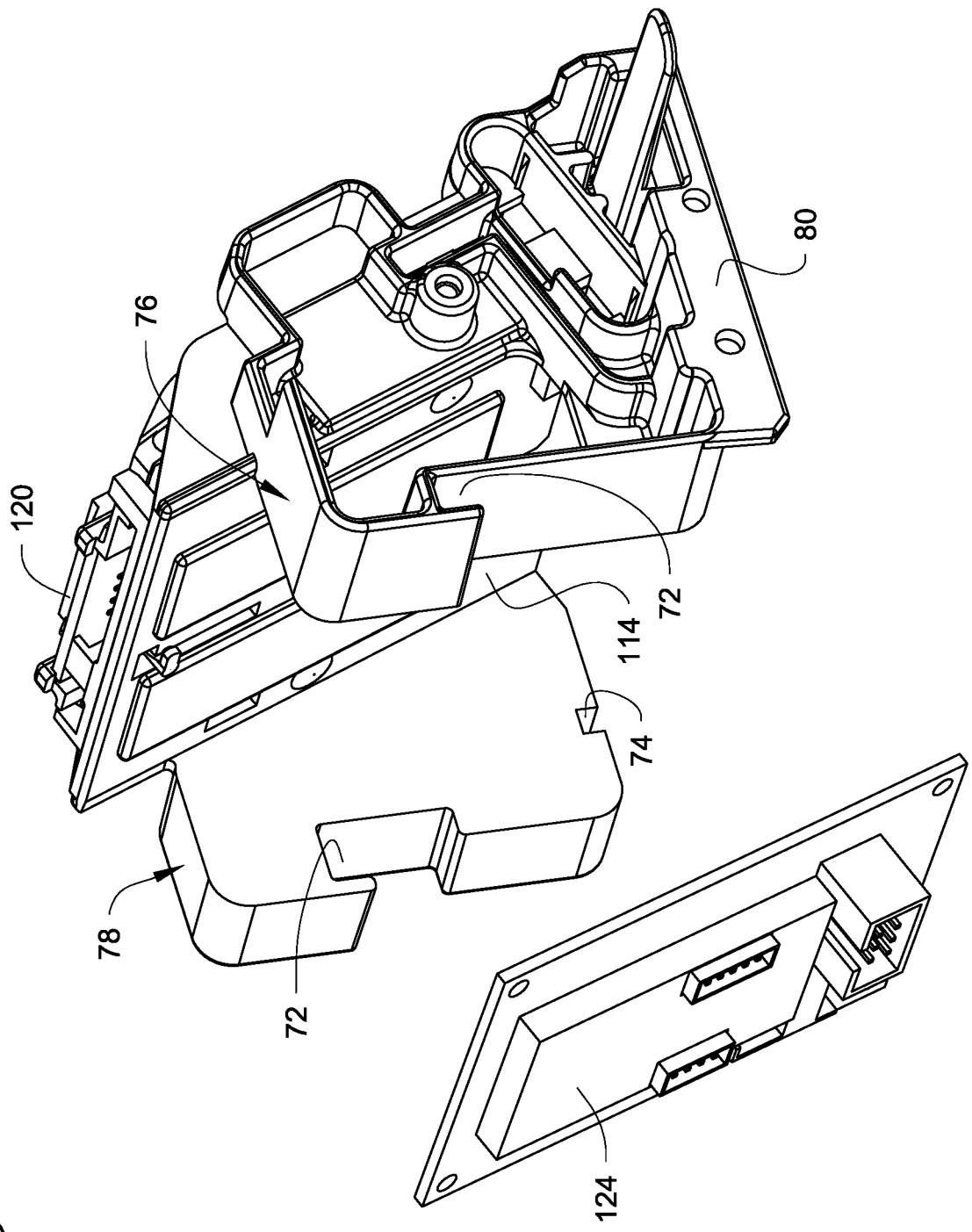
FIG. 9 is another perspective view of the smart card cartridge.
Figure 10:
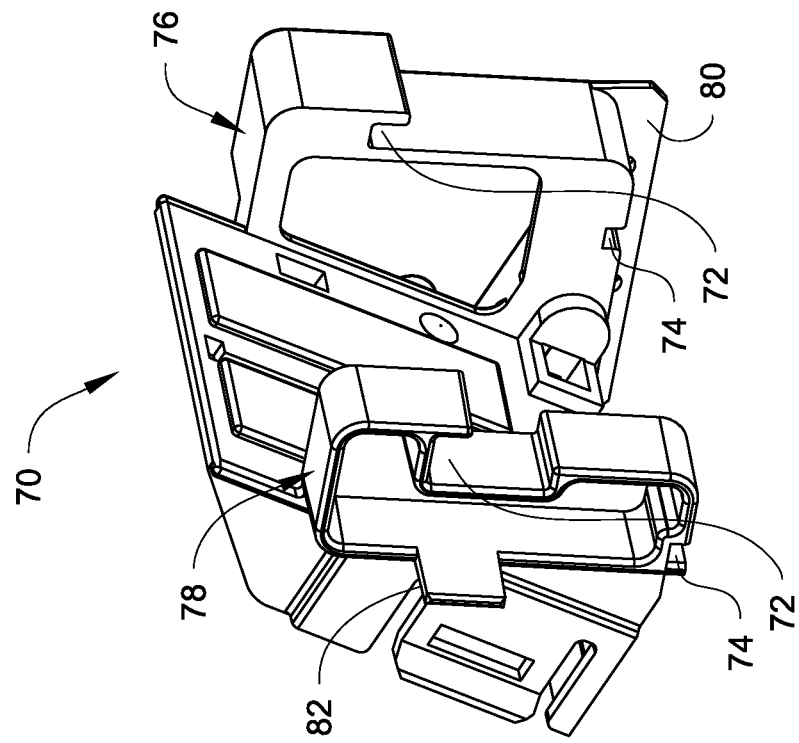
FIG. 10 is a rear perspective view of the smart card chassis.

With reference to FIGS. 8 and 9, the cartridge 12 illustrates an example of a smart card reader assembly mounted on the chassis 70. In this example, the reader assembly is configured for both contactless and contact reading/programming. In particular, the chassis 70 includes a reader mount 110 thereon. The reader mount 110 includes a first, card receiving side 112 and a second side 114. A card receiver 116a, 116b is mounted on the first side 112 and defines a plastic card receiving area that is configured to receive a plastic card 118 during electronically reading data from and/or electronically programming data on an integrated circuit chip on the plastic card 118. A contact chip programming mechanism 120 is mounted on the card receiver 116a, 116b and receives an end of the card 118 that contains a chip 122 that requires contact programming. In addition, a contactless chip programming mechanism 124 is mounted on the second side 114 of the reader mount 110 for performing contactless programming on a card having a contactless integrated circuit chip. The configuration shown in FIGS. 8 and 9 facilitates mounting of different types of chip programming mechanisms 124 on the reader mount 110. The second side 114 of the mount 110 provides a flat open space for permitting mounting of different types and configuration of the programming mechanism 124, which can be removably attached to the second side 114 via a suitable mounting mechanism, such as double-sided tape or hook and loop fasteners.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of retrofitting a desktop plastic card printer to include smart card capability, comprising:
   actuating a panel on a wall of a housing of the desktop plastic card printer from a closed position covering an opening in the wall to an open position thereby uncovering the opening and providing access to an interior space of the housing;
   after actuating the panel to the open position, mechanically installing a smart card cartridge into the interior space of the housing through the opening, the smart card cartridge is configured to electronically read data from and/or electronically program data on an integrated circuit chip of a plastic card.

2. The method of claim 1, further comprising electrically connecting the smart card cartridge to at least one smart card electrical connection of the desktop plastic card printer that is accessible through the opening.

3. The method of claim 2, comprising electrically connecting the smart card cartridge to the at least one smart card electrical connection prior to mechanically installing the smart card cartridge into the housing, after mechanically installing the smart card cartridge into the housing, or while mechanically installing the smart card cartridge into the housing.

4. The method of claim 2, wherein the at least one smart card electrical connection is on a portion of a circuit board within the housing, and the portion of the circuit board that includes the at least one smart card electrical connection overlaps the opening whereby the at least one smart card electrical connection is directly visible within the opening.

5. The method of claim 2, further comprising installing a smart card pass-through board into the housing through the opening, and the at least one smart card electrical connection is on the smart card pass-through board.

6. The method of claim 1, wherein actuating the panel from the closed position to the open position and mechanically installing the smart card cartridge into the interior space of the housing through the opening occur without using a mechanical tool.

7. The method of claim 1, wherein the panel is detached from the housing at the open position or the panel is attached to the housing at the open position.

8. A desktop plastic card printer, comprising:
   a printer housing having a wall with a panel that is configured to cover an opening in the wall that provides access to an interior space of the printer housing, the panel is actuatable between a closed position where the panel covers the opening and an open position where the opening is not covered by the panel;
   the interior space includes a smart card cartridge mount that is configured to removably receive a smart card cartridge that is configured to electronically read data from and/or electronically program data on an integrated circuit chip on a plastic card, and the smart card cartridge mount is adjacent to the opening whereby the smart card cartridge can be mechanically installed onto and removed from the smart card cartridge mount through the opening;
   at least one smart card electrical connection that is accessible through the opening, the at least one smart card electrical connection is electrically connectable to the smart card cartridge.

9. The desktop plastic card printer of claim 8, wherein the at least one smart card electrical connection is on a portion of a circuit board within the printer housing, and the portion of the circuit board that includes the at least one smart card electrical connection overlaps the opening whereby the at least one smart card electrical connection is directly visible within the opening.

10. The desktop plastic card printer of claim 8, wherein the wall is a side wall of the printer housing.

11. The desktop plastic card printer of claim 8, further comprising the smart card cartridge mounted on the smart card cartridge mount in the interior space and electrically connected to the at least one smart card electrical connection.

12. The desktop plastic card printer of claim 8, further comprising a mounting location in the printer housing for removably mounting a smart card pass-through board, the mounting location is adjacent to and accessible via the opening, and the at least one smart card electrical connection is on the smart card pass-through board.

13. The desktop plastic card printer of claim 8, further comprising a plastic card printing mechanism and a card reorienting mechanism within the printer housing.

14. The desktop plastic card printer of claim 8, wherein the panel is detached from the housing at the open position or the panel is attached to the housing at the open position.

15. A desktop plastic card printer, comprising:
   a printer housing having a front end, a rear end opposite the front end, a first side wall, a second side wall opposite the first side wall, a top, and a bottom;
   a card input hopper mounted on the printer housing, the card input hopper is configured to hold a plurality of plastic cards to be processed and from which the plastic cards are fed one-by-one for processing by the desktop plastic card printer;
   a card output from which processed plastic cards are output after being processed by the desktop plastic card printer;
   a plastic card printing mechanism in the printer housing, the plastic card printing mechanism is configured to print on the plastic cards fed from the card input hopper;
   a panel forming a portion of the first side wall, the panel is configured to cover an opening in the first side wall that provides access to an interior space of the printer housing, the panel is actuatable between a closed position where the panel covers the opening and an open position where the opening is not covered by the panel;
   the interior space is configured to removably receive a smart card cartridge that is configured to electronically read data from and/or electronically program data on an integrated circuit chip on a plastic card, and the smart card cartridge is configured to be insertable into the interior space through the opening when the panel is actuated to the open position and does not cover the opening; and at least one smart card electrical connection that is accessible in the opening when the panel is actuated to the open position and does not cover the opening, the at least one smart card electrical connection is configured to be electrically connectable to the smart card cartridge.

16. The desktop plastic card printer of claim 15, wherein the at least one smart card electrical connection is on a portion of a circuit board within the printer housing, and the portion of the circuit board that includes the at least one smart card electrical connection overlaps the opening whereby the at least one smart card electrical connection is directly visible within the opening.

17. The desktop plastic card printer of claim 15, further comprising the smart card cartridge installed in the interior space and electrically connected to the at least one smart card electrical connection.

18. The desktop plastic card printer of claim 15, further comprising a mounting location in the printer housing for removably mounting a smart card pass-through board, the mounting location is adjacent to and accessible via the opening.

19. A smart card cartridge that is removably installable within a desktop plastic card printer, comprising:
 a chassis that defines a plastic card receiving area that is configured to receive a plastic card during electronically reading data from and/or electronically programming data on an integrated circuit chip on the plastic card;
 a contact or contactless integrated circuit chip programming mechanism mounted on the chassis adjacent to the plastic card receiving area;
 first and second rail guides on the chassis that are configured to engage with rails formed on the desktop plastic card printer for removably mounting the smart card cartridge within the desktop plastic card printer;
 a snap retention mechanism on the chassis that is configured to snap fit connect with the desktop plastic card printer; and
 at least one electrical connection on the chassis that is configured for electrically connecting the smart card cartridge to at least one smart card electrical connection of the desktop plastic card printer.

20. The smart card cartridge of claim 19, wherein the plastic card receiving area is configured to receive the plastic card in a first direction, and the first and second rail guides extend in a second direction that is perpendicular to the first direction.

21. The smart card cartridge of claim 20, wherein the first and second rail guides are discontinuous in the second direction with each of the first and second rail guides including a first rail guide portion and a second rail guide portion spaced laterally from the first rail guide portion.

22. The smart card cartridge of claim 19, wherein the first and second rail guides are located on a first side of the chassis, the first rail guide is located vertically above the second rail guide, and the snap retention mechanism is located on a second side of the chassis.

* * * * *